US010528775B1

(12) United States Patent
Momose

(10) Patent No.: US 10,528,775 B1
(45) Date of Patent: Jan. 7, 2020

(54) CARD READER AND FOREIGN MATTER DETECTION METHOD

(71) Applicant: NIDEC SANKYO CORPORATION, Nagano (JP)

(72) Inventor: Munemasa Momose, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/433,371

(22) Filed: Jun. 6, 2019

(30) Foreign Application Priority Data

Jun. 18, 2018 (JP) .................. 2018-115617

(51) Int. Cl.
*G06K 7/10* (2006.01)
*G06K 7/00* (2006.01)
*G06K 13/08* (2006.01)

(52) U.S. Cl.
CPC ............. *G06K 7/10* (2013.01); *G06K 7/0008* (2013.01); *G06K 7/0091* (2013.01); *G06K 13/0806* (2013.01)

(58) Field of Classification Search
CPC ... G06K 19/00; G06K 19/06; G06K 19/06046
USPC ........................................ 235/493, 487, 375
See application file for complete search history.

(56) References Cited

U.S. PATENT DOCUMENTS 5,850,079 A * 12/1998 Ohwa .................... G06K 7/084
235/475

FOREIGN PATENT DOCUMENTS

JP 2016110415 A 6/2016

* cited by examiner

*Primary Examiner* — Edwyn Labaze
(74) *Attorney, Agent, or Firm* — Cantor Colburn LLP

(57) ABSTRACT

A card reader may include a main body part including a card conveyance path; a shutter member structured to move between a closed position and an open position; a first capacitance sensor provided in the main body part; and a control unit. The control unit may be structured to calculate a first output difference between an output of the first capacitance sensor in a first state and an output of the first capacitance sensor in a second state; calculate a second output difference between a maximum output of the first capacitance sensor in a period from the first state to the second state and the output of the first capacitance sensor in the second state; and determine that an object is installed when the first output difference is greater than a predetermined first threshold and the second output difference is less than a predetermined second threshold.

5 Claims, 14 Drawing Sheets

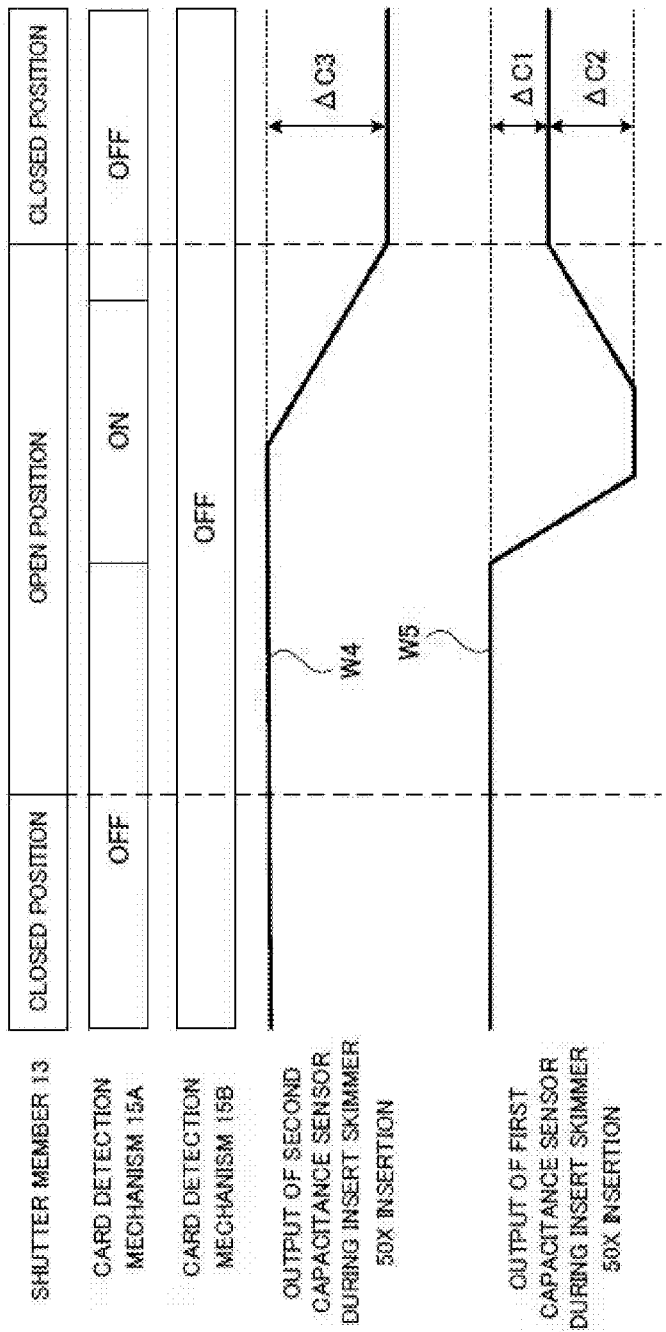

CARD READER AND FOREIGN MATTER DETECTION METHOD

CROSS REFERENCE TO RELATED APPLICATION

The present application claims priority under 35 U.S.C. § 119 to Japanese Application No. 2018-115617 filed Jun. 18, 2018, the entire content of which is incorporated herein by reference.

FIELD OF THE INVENTION

At least an embodiment of the present invention relates to a card reader for reading data recorded on a card or recording data onto the card. Further, at least an embodiment of the present invention relates to a foreign matter detection method for such a card reader.

BACKGROUND

Card readers for reading magnetic data recorded on a card and recording magnetic data onto the card have been used widely. In industries such as financial institutions where card readers are used, so-called skimming in which the magnetic data of a card is illegally acquired using a magnetic head by a criminal attaching the magnetic head to a card insertion part of a card reader has become a large problem. The tricks used for skimming by criminals become more sophisticated year by year, and the situation in which a device for skimming such as a magnetic head for skimming (hereinafter, referred to as an "insert skimmer") for reading the magnetic data of the card is attached to the inside of a card reader occurs. Therefore, various techniques for detecting that an insert skimmer has been inserted on the inside of a card reader have been proposed.

For example, JP-A 2016-110415 discloses a card reader comprising a capacitance sensor attached to a card passage which passes through a card inserted from an insertion port of the card. If an insert skimmer is attached to the card passage, it is detected as a foreign matter by the capacitance sensor, and a process such as notifying a predetermined alarm to the host device is performed.

If a host device on which a card reader is mounted is installed outdoors, or if a card is inserted in a card reader in a state in which snow or rain water are adhered to the card, there is the possibility that a liquid such as water will enter the card conveyance path. As described in JP-A 2016-110415, in a method for using a capacitance sensor to detect the attachment of an insert skimmer, it is necessary to discriminate between the case when the capacitance increased due to the entry of a liquid and the case when the capacitance increased due to the attachment of the insert skimmer.

SUMMARY

At least an embodiment of the present invention, in consideration of the aforementioned situation, provides a card reader which can detect the foreign matter with a high accuracy by discriminating the case when a liquid enters a card conveyance path and the case when an insert skimmer is attached, and the foreign matter detection method The card reader of at least an embodiment of the present invention includes a main body part including a card conveyance path in which a card inserted into an insertion port is conveyed, a shutter member structured to move between a closed position which closes the card conveyance path and an open position which opens the card conveyance path, a first capacitance sensor provided in the main body part and structured to detect that an object is present in the card conveyance path, and a control unit structured to calculate a first output difference which is a difference between an output of the first capacitance sensor in a first state in which the shutter member is in the closed position and the output of the first capacitance sensor in a second state in which the shutter member moves from the first state to the open position and then moves to the closed position, calculate a second output difference which is a difference between a maximum output of the first capacitance sensor in a period from the first state to the second state and the output of the first capacitance sensor in the second state, and perform a process for determining that an object other than the card is installed in the card conveyance path when the first output difference is a predetermined first threshold or more, and the second output difference is less than a predetermined second threshold.

A foreign matter detection method for a card reader of at least an embodiment of the present invention includes a main body part including a card conveyance path in which a card inserted into an insertion port is conveyed, a shutter member structured to move between a closed position which closes the card conveyance path and an open position which opens the card conveyance path, and a first capacitance sensor provided in the main body part and structured to detect that an object is present in the card conveyance path, the foreign matter detection method including calculating a first output difference which is a difference between an output of the first capacitance sensor in a first state in which the shutter member is in the closed position and the output of the first capacitance sensor in a second state in which the shutter member moves from the first state to the open position and then moves to the closed position, calculating a second output difference which is a difference between a maximum output of the first capacitance sensor in a period from the first state to the second state and the output of the first capacitance sensor in the second state, and determining that an object other than the card is installed in the card conveyance path when the first output difference is a predetermined first threshold or more, and the second output difference is less than a predetermined second threshold.

At least an embodiment of the present invention can provide a card reader which can discriminate between the case when a liquid enters a card conveyance path and the case when an insert skimmer is attached to perform detection of the foreign matter with a high accuracy, and a foreign matter detection method.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 14 is a diagram illustrating an example of the output waveform of the capacitance sensor during a period in which the aforementioned control for moving the shutter member 13 to the closed position after moving the shutter member 13 to the open position is performed.

DETAILED DESCRIPTION

Configuration of Card Reader

Figure 1:
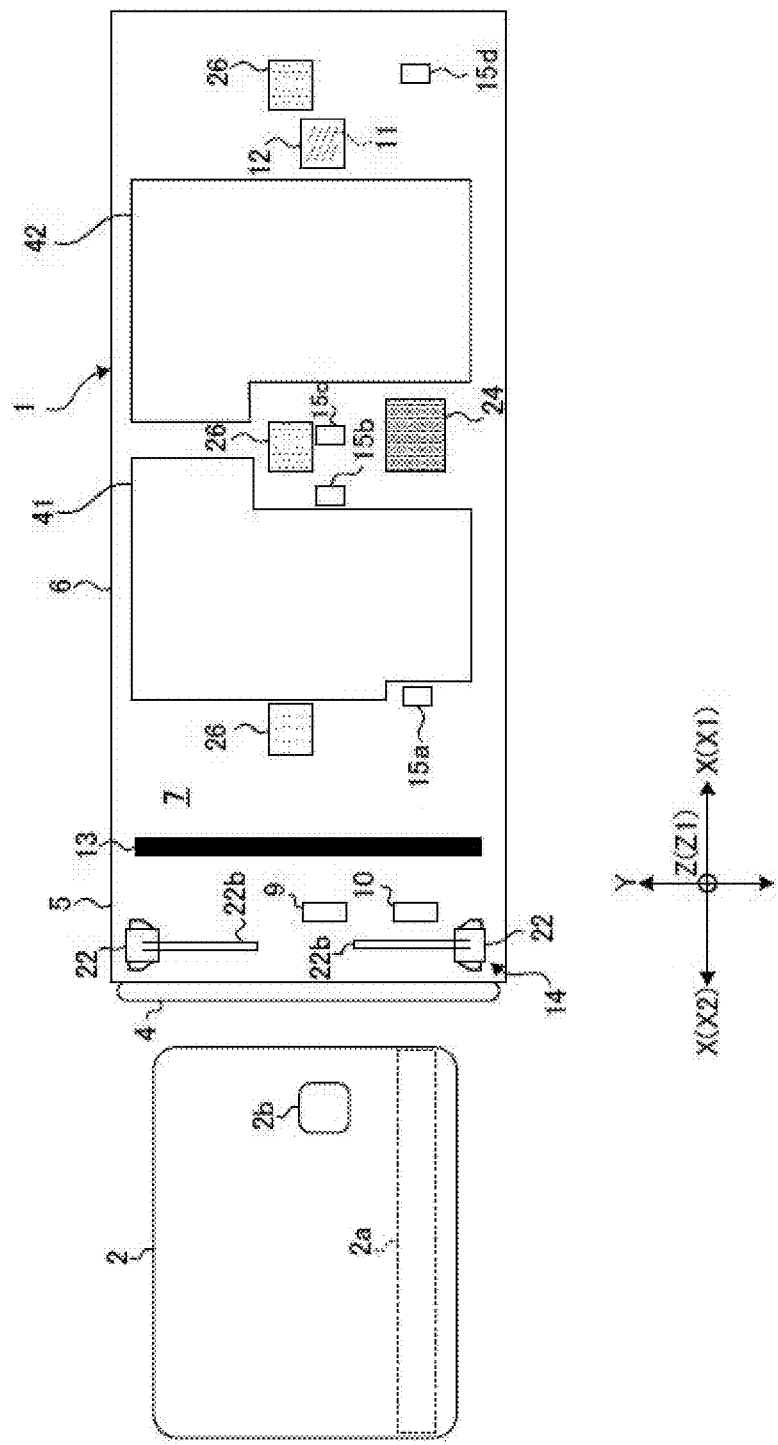
FIG. 1 is a plan view describing the configuration of a card reader 1 according to an embodiment of the card reader of the present invention.
Figure 2:
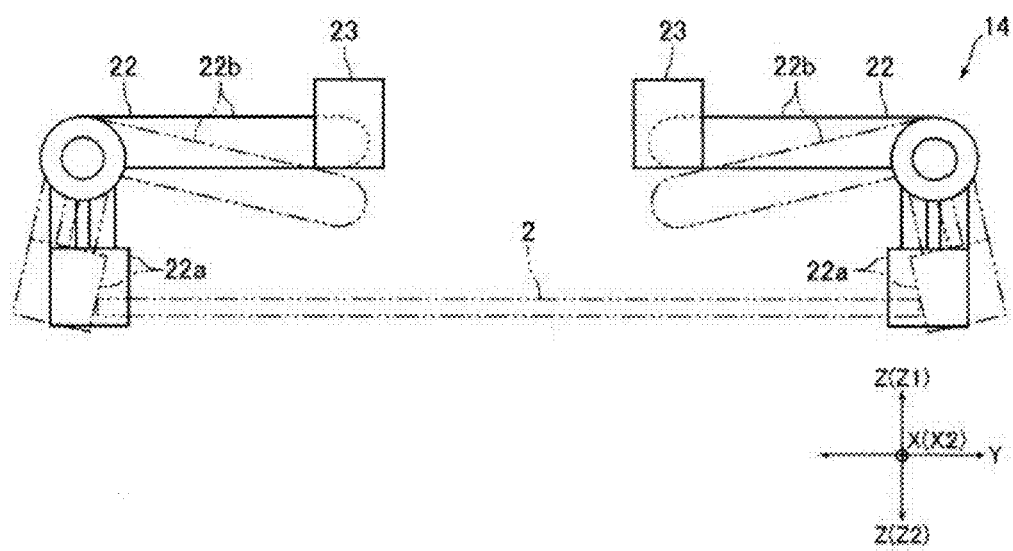
FIG. 2 is a front view describing the configuration of a card insertion detection mechanism 14 shown in FIG. 1.
Figure 3:
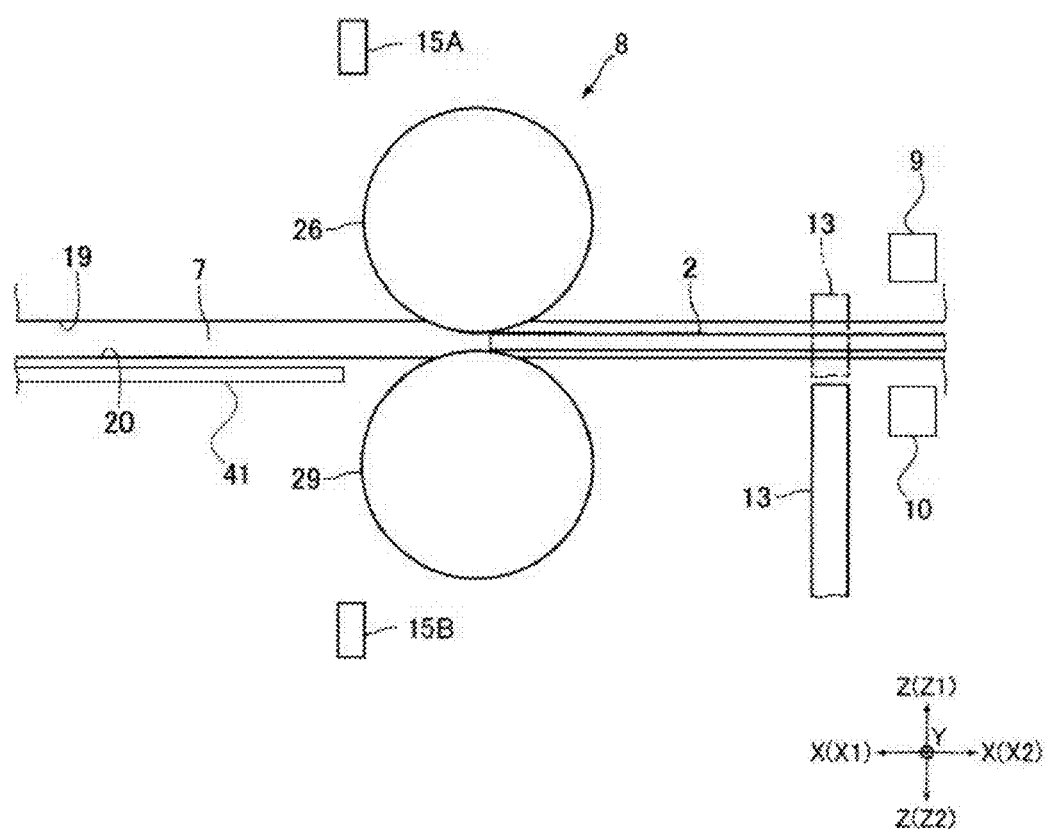
FIG. 3 is a side view describing the configuration of a prehead 10, an IC chip sensor 9, a card detection mechanism 15a and a conveyance roller 26 shown in FIG. 1.
Figure 4:
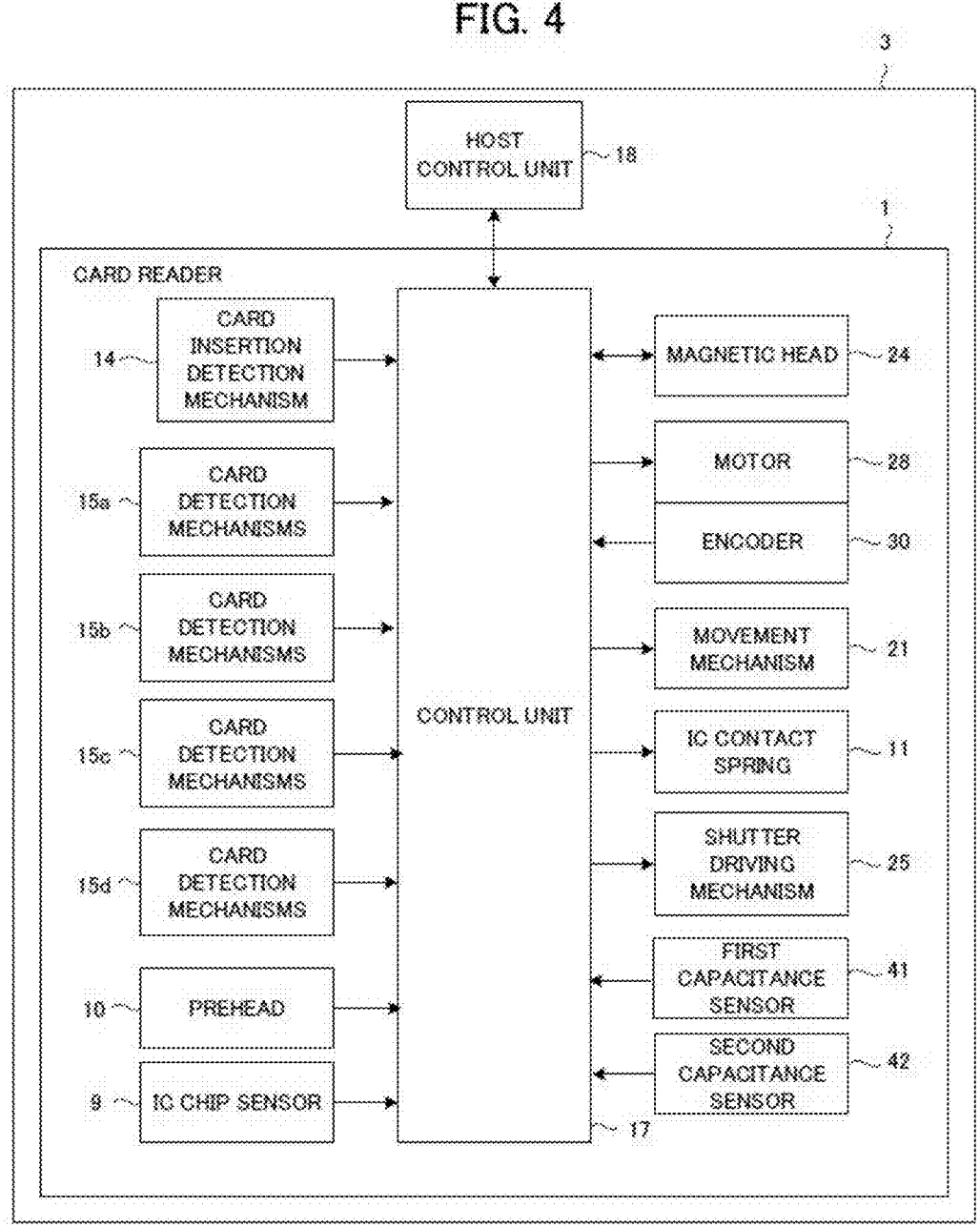
FIG. 4 is a block diagram of a host device 3 on which the card reader 1 shown in FIG. 1 is mounted and the card reader 1.

FIG. 1 is a plan view describing the configuration of a card reader 1 according to an embodiment of the card reader of the present invention. FIG. 2 is a front view describing the configuration of a card insertion detection mechanism 14 shown in FIG. 1. FIG. 3 is a side view describing the configuration of the prehead 10, the IC chip sensor 9, the first capacitance sensor 41, the card detection mechanism 15a and the conveyance roller 26 shown in FIG. 1. FIG. 4 is a block diagram of a host device 3 on which the card reader 1 shown in FIG. 1 is mounted and the card reader 1.

The card reader 1 is a device for reading data recorded on a card 2 and recording data into the card 2, and is used by mounting on a host device 3 (refer to FIG. 4) such as an Automated Teller Machine (ATM). As shown in FIG. 1, the card reader 1 includes a card insertion unit 5 in which an insertion port 4 for inserting a card 2 is formed, and a main body part 6. A card conveyance path 7 in which the card 2 which is inserted into the insertion port 4 is conveyed is formed on the inside of the main body part 6 of the card reader 1, and the card reader 1 includes a card conveyance mechanism 8 (Refer to FIG. 3) which conveys the card 2 on the card conveyance path 7.

The card reader 1 conveys the card 2 in the X direction shown in FIG. 1 and the like. Further, the card 2 is inserted in the X1 direction and ejected in the X2 direction of FIG. 1 and the like. Namely, the X1 direction is the insertion direction of the card 2 into the insertion port 4, and the X2 direction is the ejection direction of the card 2 from the injection port 4. Further, the Z direction in FIG. 1 and the like, which is orthogonal to the X direction is the thickness direction of the card 2 inserted in the insertion port 4, and the Y direction in FIG. 1 and the like, which is orthogonal to the X direction and the Z direction is the width direction of the card 2. In the following description, the X direction is the front and rear direction, the Y direction is the right and left direction, and the Z direction is the vertical direction. Further, the side (X2 direction side) on which the insertion port 4 is formed in the front and rear direction is a "front" side, and the opposite side (X1 direction side) is a "rear (back)" side. Further, one side (Z1 direction side) in the vertical direction is an "upper" side, and the opposite side (Z2 direction side) is a "lower" side.

The card 2 is, for example, a rectangular-shaped card made of vinyl chloride and having a thickness in the range of 0.7 mm to 0.8 mm. Further, the card 2 is a contact type IC card with a magnetic stripe as prescribed by International Standard (ISO/IEC7811) or Japanese Industrial Standards JIS (JISX6302). As shown in FIG. 1, a magnetic stripe in which magnetic data is to be recorded is formed on the back face (bottom surface) of the card 2. Further, an IC chip may be incorporated in the card 2, and an external connection terminal 2b of the IC chip is formed on the front side (upper side) of the card 2. The magnetic stripe 2a and the external connection terminal 2b are formed in a predetermined position prescribed by the international standards or JIS standards.

The card reader 1 comprises a magnetic head 24 for performing at least one of reading magnetic data recorded on a magnetic stripe 2a or recording magnetic data onto the magnetic stripe 2a (refer to FIG. 1), and an IC contact block 12 having a plurality of IC contact springs 11 in contact with the external connection terminal 2b of the card 2 on the inside of the main body part 6.

Further, the card reader 1 comprises a shutter member 13 for closing the card conveyance path 7, a card insertion detection mechanism 14 for detecting that a card 2 has been inserted in the insertion port 4, a prehead 10, an IC chip sensor 9, card detection mechanisms 15a, 15b, 15c and 15d for detecting the presence of a card 2 in the card conveyance path 7, a first capacitance sensor 41 and a second capacitance sensor 42 for detecting the presence of an object in the card conveyance path 7, and a control unit 17 for controlling the card reader 1. The control unit 17 is connected to a host control unit 18 which is the control unit of the host device 3 (refer to FIG. 4).

The card insertion unit 5 is connected to the front end of the main body part 6. The card conveyance path 7, as shown in FIG. 3, includes an upper guide member 19 constituting the upper surface of the card conveyance path 7 and a lower guide member 20 constituting the lower surface of the card conveyance path 7. The upper guide member 19 and the lower guide member 20 are made of an insulating resin material. As shown in FIG. 1, the magnetic head 24 and the IC contact block 12 are disposed on the inside of the main body part 6. The magnetic head 24 is disposed so that a gap part of the magnetic head 24 faces the card conveyance path 7 from the lower side. The IC contact block 12 is disposed on the rear side relative to the magnetic head 24. Further, the IC contact block 12 is disposed so as to face the card conveyance path 7 from the upper side. The magnetic head 24 is electrically connected to the control unit 17 (refer to FIG. 4). Note that, the IC contact block 12 may be configured to be disposed in front of the magnetic head 24 (for example, between the second conveyance roller 26 and the first conveyance roller 26 counting from the side closer to shutter member 13).

The movement mechanism 21 (refer to FIG. 4) which moves the IC contact block 12 between a contactable position in which the IC contact spring 11 can be in contact with the external connection terminal 2b of the card 2 and a retreated position retreated (specifically, retreating to the upper side) so that the IC contact spring 11 is not in contact with the external connection terminal 2b of the card 2 is connected to the IC contact block 12.

The movement mechanism 21 includes a drive source such as a solenoid, and a power transmission mechanism such as a link mechanism for transmitting the power of the drive source to the IC contact block 12. The movement mechanism 21 is connected to the control unit 17. Specifically, the drive source of the movement mechanism 21 is electrically connected to the control unit 17. The IC contact spring 11 is electrically connected to the control unit 17. The control unit 17 supplies current to the IC contact spring 11. Examples of the movement mechanism 21 include the configuration described in WO 2018/61685, the configuration described in WO 2016/158946, or the configuration which moves using a cam groove.

The card insertion detection mechanism 14 is disposed on the rear side of the insertion port 4, and detects the card 2 inserted in the insertion port 4. The card insertion detection mechanism 14 detects that the card 2 is inserted into the insertion port 4 by detecting the width (width in the right and left direction) of the card 2 inserted in the insertion port 4. As shown in FIG. 2, this card insertion detection mechanism 14 includes two lever members 22 respectively disposed on both sides in the right and left direction and two sensors 23. The card insertion detection mechanism 14 is disposed in a front end side portion of the card insertion unit 5. Further, card insertion detection mechanism 14 is electrically connected to the control unit 17. Specifically, the two sensors 23 are electrically connected to the control unit 17. The sensor 23 is a transmission type optical sensor having a light emitting element and a light receiving element disposed so as to face each other. The sensor 23 is disposed on the upper side of the card conveyance path 7 so that the light emitting unit and the light receiving unit face each other in the front and rear direction. Note that, in FIG. 1, the illustration of the sensor 23 has been omitted.

The lever member 22 is formed so that the shape as viewed from the front and rear direction is substantially L-shaped, and is constituted from card contact parts 22a respectively disposed on both end sides of the card conveyance path 7 in the right and left direction, and a light intercepting parts 22b extending from the upper end of the card contact part 22a to the inside in the right and left direction. This lever member 22 is rotatably held by a frame of the card insertion unit 5, so as to make it possible to have a center of rotation at the boundary between the card contact part 22a and the light intercepting parts 22b and rotation in the front and rear direction as the axis of rotation. The light intercepting parts 22b are disposed on the upper side of the card conveyance path 7. Further, the lever member 22 is biased by a spring member which is not shown so that the lower end side of the card contact part 22a is disposed in the card conveyance path 7.

During the standby mode prior to the card 2 being inserted into the insertion port 4, as shown by the solid line of FIG. 2, the lower end side of the card contact part 22a is disposed in the card conveyance path 7, and the two respective light intercepting parts 22b intercept between the light emitting unit of sensor 23 and the light receiving unit. At this time, the card insertion detection mechanism 14 is in an OFF state. In this state, when the card 2 in which the width of the short-side direction is a predetermined width is inserted in the insertion port 4, as shown by the two-dot chain line of FIG. 2, both the left and right ends of the card 2 contact with the lower end side of the two respective card contact parts 22a to rotate the two lever members 22 until the two respective light intercepting parts 22b are separated from the light emitting unit of the sensor 23 and the light receiving unit. If the two respective light intercepting parts 22b are separated from the light emitting unit of the two sensors 23 and the light receiving unit, the card insertion detection mechanism 14 is in the ON state.

On the one hand, the width of the card 2 inserted in the insertion port 4 is narrower than the predetermined width, thus, when the light intercepting parts 22b are not separated from between the light emitting unit of sensor 23 of at least one of the two sensors 23 and the light receiving unit, the card insertion detection mechanism 14 remains in the OFF state. Therefore, the card insertion detection mechanism 14 detects a card 2 by switching from an OFF state to an ON state when the width in the right and left direction of the card 2 inserted in the insertion port 4 is a predetermined width. Note that, during the standby mode prior to the card 2 being inserted into the insertion port 4, by separating the two respective light intercepting parts 22b between the light emitting unit of the sensor 23 and the light receiving unit, the card insertion detection mechanism 14 may be in an OFF state. In this case, when a card 2 having a predetermined width is inserted in the insertion port 4, and the space between the light emitting unit of the sensor 23 and the light receiving unit is intercepted by the two respective light intercepting parts 22b, the card insertion detection mechanism 14 is in the ON state. The configuration of the card insertion detection mechanism 14 is not limited to that shown in FIG. 2. For example, the card contact part 22a may be disposed to only one side in the width direction of the card, and the other side may be a side surface of the conveyance path of the card. In this case, by setting the distance between the card contact part 22a and the side surface of the conveyance path of the card to a predetermined width (slightly narrower than the width of the card), the insertion will be detected when the card is inserted.

The shutter member 13 is disposed in the boundary portion between the card insertion unit 5 and the main body part 6, in other words, the rear end side of the card insertion unit 5. The shutter driving mechanism 25 (refer to FIG. 4) is connected to the shutter member 13. The shutter driving mechanism 25 includes a drive source such as a solenoid, and a power transmission mechanism such as a link mechanism for transmitting the power of the drive source to the shutter member 13.

The shutter driving mechanism 25 is connected to the control unit 17. Specifically, the drive source of the shutter driving mechanism 25 is electrically connected to the control unit 17.

The shutter member 13 is capable of moving between a closed position (position illustrated by the two-dot chain line of FIG. 3) which closes the card conveyance path 7 and an open position (position illustrated by the solid line of FIG. 3) which retreats from the card conveyance path 7 to open the card conveyance path 7.

The prehead 10 is a magnetic head for detecting whether or not the desired magnetic data determined in accordance with the standards has been recorded on the magnetic stripe 2a of the card 2 inserted from the insertion port 4. The prehead 10 is disposed between the card insertion detection mechanism 14 and the shutter member 13 in the card insertion unit 5, and detects magnetism from the position where the magnetic stripe 2a of the card 2 inserted in the insertion port 4 is to be formed. The prehead 10 functions as a magnetic detector. The prehead 10 is disposed in the right and left direction in almost the same position as the magnetic head 24 in the main body part 6. As shown in FIG. 3, the prehead 10 is disposed so that the gap part of the prehead 10 faces to the card 2 inserted in the insertion port 4 from the lower side.

The IC chip sensor 9 is a sensor for detecting whether or not an IC chip has been mounted on the card 2 inserted from the insertion port 4. Specifically, the IC chip sensor 9 is a metal sensor for detecting the metal contained on the external connection terminal 2b of the card 2 inserted from the insertion port 4. The IC chip sensor 9 is disposed in the card insertion unit 5 between the card insertion detection mechanism 14 and the shutter member 13, and detects the metal from the position where the external connection terminal 2b of the card 2 inserted in the insertion port 4 is to be formed. The IC chip sensor 9 functions as a metal detector.

The IC chip sensor 9 is in the same position in the front and rear direction as the prehead 10, and is disposed in the right and left direction in almost the same position as the IC contact block 12 in the main body part 6. As shown in FIG. 3, the IC chip sensor 9 is disposed so as to face the card 2 inserted in the insertion port 4 from the upper side.

The card detection mechanisms 15a, 15b, 15c and 15d are disposed on the inside of the main body part 6. Namely, the card detection mechanisms 15a, 15b, 15c and 15d are disposed on the rear side relative to the card insertion detection mechanism 14, the prehead 10 and the IC chip sensor 9. Further, the card detection mechanisms 15a, 15b, 15c and 15d are respectively disposed in a state shifted in the front and rear direction. The card detection mechanism 15b is disposed on the rear side relative to the card detection mechanism 15a, the card detection mechanism 15c is disposed on the rear side relative to the card detection mechanism 15b, and the card detection mechanism 15d is disposed on the rear side relative to the card detection mechanism 15c. As shown in FIG. 4, the card detection mechanisms 15a, 15b, 15c and 15d are electrically connected to the control unit 17. Further, as shown in FIG. 3, the card detection mechanisms 15a, 15b, 15c and 15d are transmission type optical sensors each having a light emitting unit 15A and a light receiving unit 15B disposed facing each other. Note that, in FIG. 3, an illustration of the card detection mechanisms 15b, 15c and 15d has been omitted. As shown in FIG. 3, the light emitting unit 15A and the light receiving unit 15B are disposed in a state in which the card conveyance path 7 is sandwiched in the vertical direction.

When there is no card 2 between the light emitting unit 15A and the light receiving unit 15B, the light receiving unit 15B receives light from the light emitting unit 15A. At this time, the card detection mechanisms 15a, 15b, 15c and 15d are in an OFF state. In this state, if a card 2 enters between the light emitting unit 15A and the light receiving unit 15B, the light from the light emitting unit 15A to the light receiving unit 15B is intercepted so that the card detection mechanisms 15a, 15b, 15c and 15d are in the ON state. Therefore, the card detection mechanisms 15a, 15b, 15c and 15d detect the card 2 by switching from an OFF state to an ON state. The card detection mechanisms 15a, 15b, 15c and 15d are disposed in a state in which the card 2 is present in the card conveyance path 7 so that at least one of the card detection mechanisms 15a, 15b, 15c and 15d is in the ON state.

Note that, the card detection mechanisms 15a, 15b, 15c and 15d may be reflection type optical sensors. In this case, when the light receiving unit does not receive light from the light emitting units of the card detection mechanisms 15a, 15b, 15c and 15d, the card detection mechanisms 15a, 15b, 15c and 15d are in the OFF state, thus, if the light receiving unit receives light emitted from the light emitting units of the card detection mechanisms 15a, 15b, 15c and 15d and reflected from the card 2, the card detection mechanisms 15a, 15b, 15c and 15d are in the ON state.

As shown in FIG. 3, the card conveyance mechanism 8 includes three conveyance rollers 26 (refer to FIG. 1. In FIG. 3, only the most front side of the rollers is illustrated) in contact with the card 2 so as to convey the card 2 on the card conveyance path 7, a motor 28 (refer to FIG. 4) for driving each conveyance roller 26, and a power transmission mechanism (not shown) for transmitting the power of the motor 28 to each conveyance roller. Each conveyance roller 26 is disposed on the inside of the main body part 6. Namely, the conveyance rollers 26 are disposed to the rear side relative to the card insertion detection mechanism 14.

As shown in FIG. 3, a pad roller 29 is disposed to oppose each conveyance roller 26.

Each conveyance roller 26 and the pad roller 29 are opposed in the vertical direction. Further, the pad roller 29 is biased toward the conveyance roller 26, and the card 2 is conveyed in a state sandwiched between the conveyance roller 26 and the pad roller 29.

An encoder 30 for detecting the rotation of the motor 28 is attached to the motor 28 (refer to FIG. 4). In the present embodiment, it is possible to make the conveyance roller 26 rotate even in a state when the motor 28 is stopped, and if the conveyance roller 26 is rotated in the state when the motor 28 is stopped, the rotation of the motor 28 is detected by the encoder 30. Namely, if the conveyance roller 26 rotates in the state in which the motor 28 is stopped, the rotation of the conveyance roller 26 is detected by the encoder 30. The motor 28 and the encoder 30 are electrically connected to the control unit 17.

As partially illustrated in FIG. 3, a first capacitance sensor 41 and a second capacitance sensor 42 for detecting the change of the capacitance on the inside of the card conveyance path 7 due to an object passing through the card conveyance path 7 are incorporated in the lower guide member 20. The first capacitance sensor 41 and the second capacitance sensor 42 may be incorporated in the upper guide member 19. As shown in FIG. 1, the first capacitance sensor 41 is disposed in a position which does not overlap with the card detection mechanism 15a and the card detection mechanism 15b between the closest conveyance roller 26 of the three conveyance rollers 26 and the subsequent conveyance roller 26. The second capacitance sensor 42 is disposed on the rear side of the front and rear direction relative to the first capacitance sensor 41, and is disposed in a position which does not overlap with the magnetic head 24 and the IC contact block 12 three conveyance rollers 26 between the closest conveyance roller 26 of the three conveyance rollers 26 and the subsequent conveyance roller 26. The output signals of the first capacitance sensor 41 and the second capacitance sensor 42 are transmitted to the control unit 17. Note that, when the upper surface of the card conveyance path 7 is formed by, for example, a conductive material, the change of the capacitance due to the movement of the IC contact block 12 is hardly detected. Therefore, the second capacitance sensor 42 may be provided in a position overlapping with the IC contact block 12.

(Configuration Example of Assumed Insert Skimmer)

Figure 5A:
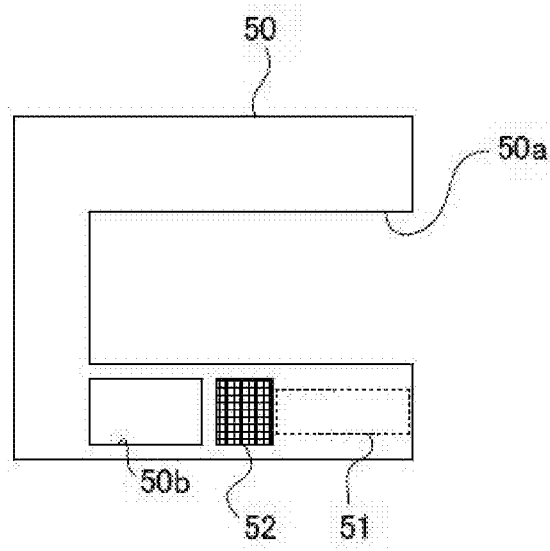
FIG. 5A is a diagram illustrating a first configuration example of the insert skimmer assumed to be inserted on the inside of the card reader.
Figure 5B:
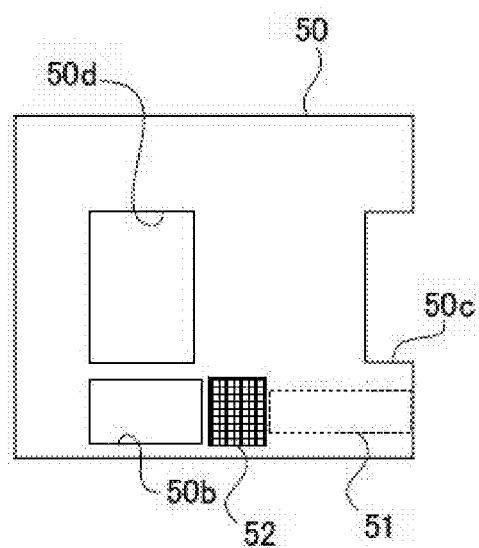
FIG. 5B is a diagram illustrating a second configuration example of an insert skimmer assumed to be inserted on the inside of the card reader.
Figure 6:
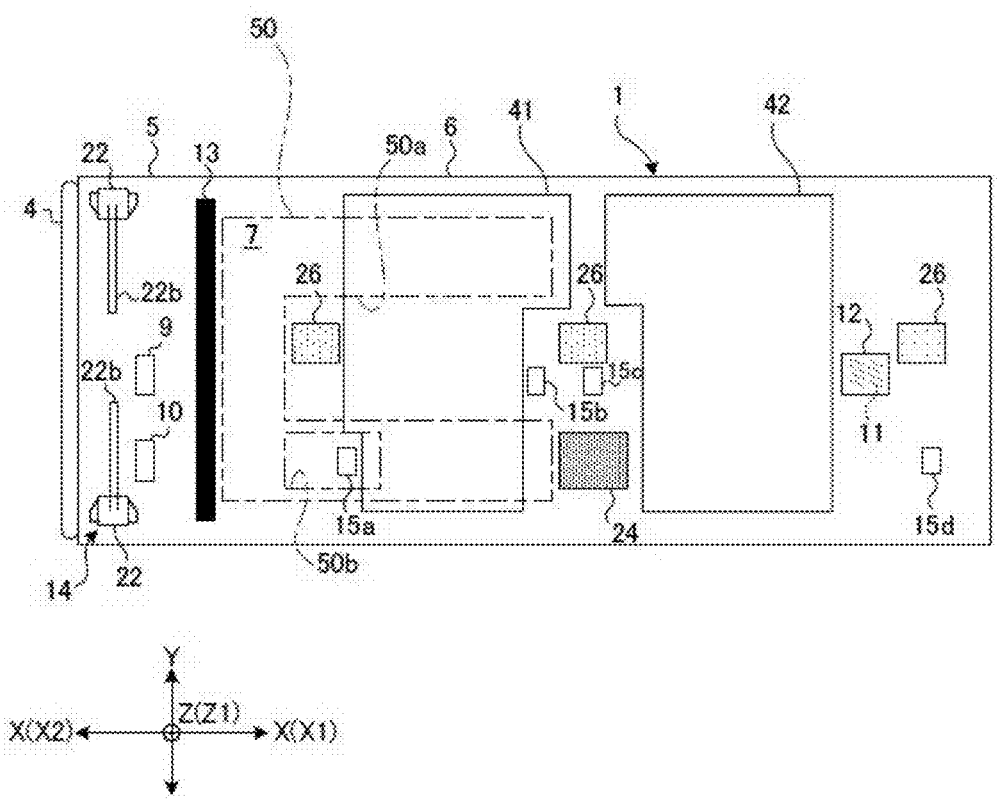
FIG. 6 is a plan view illustrating a state in which an insert skimmer 50 shown in FIG. 5A is inserted in a main body part 6 of the card reader 1.

FIG. 5A is a diagram illustrating a first configuration example of the insert skimmer assumed to be inserted on the inside of the card reader. FIG. 5B is a diagram illustrating a second configuration example of the insert skimmer assumed to be inserted on the inside of the card reader. FIG. 6 is a plan view illustrating a state in which the insert skimmer 50 shown in FIG. 5A is inserted in the main body part 6 of the card reader 1.

The insert skimmer 50 shown in FIGS. 5A and 5B includes a main body part formed by a rectangular plate shaped electrically-conductive material in which the width in the right and left direction is substantially the same as the width of the card 2. Specifically, the main body part of the insert skimmer 50 is made of metal. A cutout part 50a or an aperture 50d for avoiding contacting with the conveyance roller 26 which is closest to the front side in the main body part 6 of the card reader 1 is formed in the main body part of the insert skimmer 50 shown in FIG. 5A and FIG. 5B. Further, a through hole 50b is formed in the main body part of the insert skimmer 50 shown in FIG. 5A and FIG. 5B so as to not block light from the light emitting unit 15A of the card detection mechanism 15a toward the light receiving unit 15B when the insert skimmer 50 is attached to the main body part 6 of the card reader 1. Further, the cutout part 50c is formed in the main body part of the insert skimmer 50 shown in FIG. 5B so as to not block the light from the light emitting unit 15A of the card detection mechanism 15b toward the light receiving unit 15B when the insert skimmer 50 is attached to the main body part 6 of the card reader 1. The insert skimmer 50 shown in FIG. 5A is inserted in the main body part 6 by pushing manually because the cutout part 50a is large and the area of the main body part which can contact with the conveyance roller 26 is small. Because the insert skimmer 50 shown in FIG. 5B has a large area of the main body part which can contact with the conveyance roller 26, it is inserted in the main body part 6 by conveying with the conveyance roller 26 when the insert skimmer 50 is inserted into the insertion port 4.

A counterfeit magnetic stripe 51 is formed in the end part (tip end) of the rear side in the front and rear direction of the main body part of the insert skimmer 50 shown in FIGS. 5A and 5B, and the magnetic head 52 for reading the magnetic information from the magnetic stripe of the legitimate card 2 is formed to the left of this magnetic stripe 51. The information recorded on the magnetic stripe 51 is the same as the information recorded on the tip end of the magnetic stripe 2a of the legitimate card 2. The through hole 50b and the magnetic head 52 must be formed in the same position as the magnetic stripe 51 in the right and left direction in the main body part of the insert skimmer 50, thus, the length in the front and rear direction of the magnetic stripe 51 becomes sufficiently smaller than the length in the front and rear direction of the magnetic stripe 2a of the legitimate card 2. Note that, it is assumed that the position of the magnetic head 52 is, for example, on the right side of the through hole 50b. Further, it is assumed that the width of the front and rear direction of the through hole 50b is somewhat large somewhat large in order to definitely avoid the card detection mechanism 15a.

The control unit 17 of the card reader 1 shown in FIG. 4 performs overall control of the entirety of the card reader 1, and specifically, contains various processors which execute programs and perform processes, a Random Access Memory (RAM), and a Read Only Memory (ROM). The various processors include a central processing unit (CPU) which is a general-purpose processor functioning as various processing units by executing a program, a programmable logic device (PLD) which is a processor capable of changing a circuit configuration after a field-programmable gate array (FPGA) is manufactured, and a dedicated electric circuit which is a processor having a dedicated circuit configuration designed for performing a specific process such as an Application-Specific Integrated Circuit (ASIC). More specifically, the configuration of each of the various processors is an electrical circuit in which circuit elements, such as semiconductor elements, are combined. The control unit 17 may be configured by one of these various processors, or may be configured by a combination of two or more same or different processors (for example, a combination of a plurality of the FPGAs or the CPU and the FPGA).

The control unit 17 operates the prehead 10 and the IC chip sensor 9 when the legitimate card 2 is inserted in the insertion port 4 and the insertion of the card 2 is detected by the card insertion detection mechanism 14. Moreover, when the prehead 10 successfully read the desired information from the tip end of the magnetic stripe 2a of the card 2, or, the IC chip sensor 9 detected the IC chip (metal), the control unit moves the shutter member 13 from the closed position to the open position. Therefore, the card 2 can be incorporated into the main body part 6.

Further, the control unit 17 operates the prehead 10 and the IC chip sensor 9 when the insert skimmer 50 having the magnetic stripe 51 shown in FIG. 5A and FIG. 5B is inserted in the insertion port 4 and the insertion of the insert skimmer 50 is detected by the card insertion detection mechanism 14. Moreover, if the prehead 10 successfully reads the desired information from the magnetic stripe 51 of the insert skimmer 5 and the IC chip sensor 9 detected the metal of the main body part of the insert skimmer 50, the control unit 17 moves the shutter member 13 from the closed position to the open position.

Figure 7:
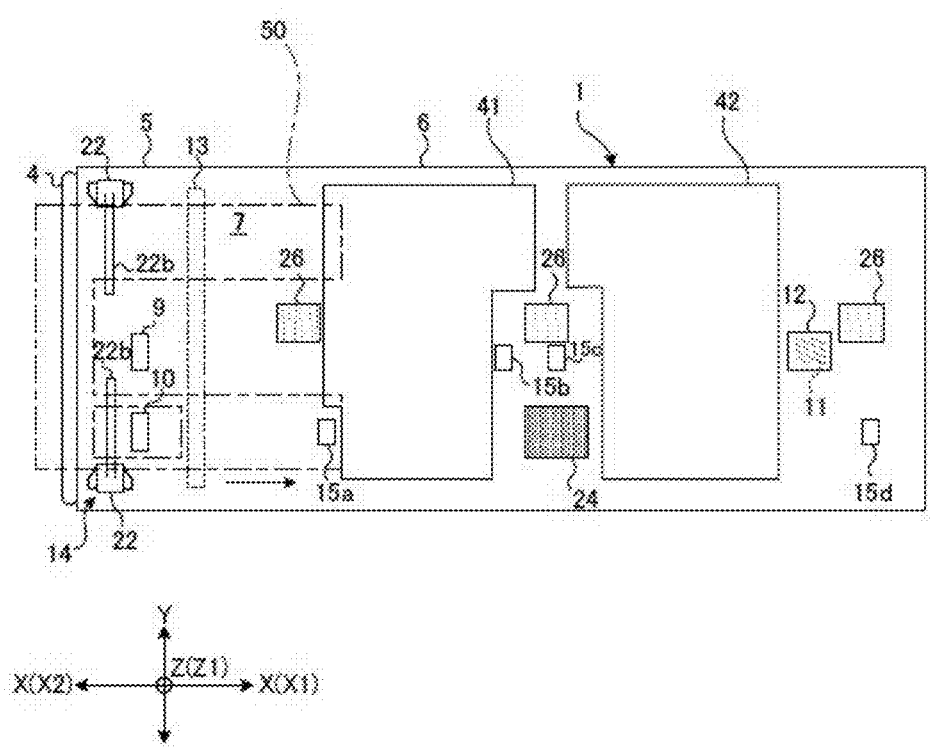
FIG. 7 is a diagram illustrating a state in which the insert skimmer 50 is inserted in an insertion port 4 and the card detection mechanism 15a is in the ON state.

Therefore, as shown in FIG. 7, the insert skimmer 50 can be inserted on the inside of the main body part 6. In FIG. 7, the shutter member 13 is indicated by a broken line which indicates that it is in the open position.

The control unit 17 moves the shutter member 13 from the closed position to the open position as stated above, and then, when each of the card detection mechanisms 15a, 15b, 15c and 15d are in the OFF state at the timing when the card detection mechanism 15a returned to the OFF state after being in the ON state, moves the shutter member 13 to the closed position and performs a control for returning to a standby state when the card insertion detection mechanism 14 is in the OFF state.

Figure 8:
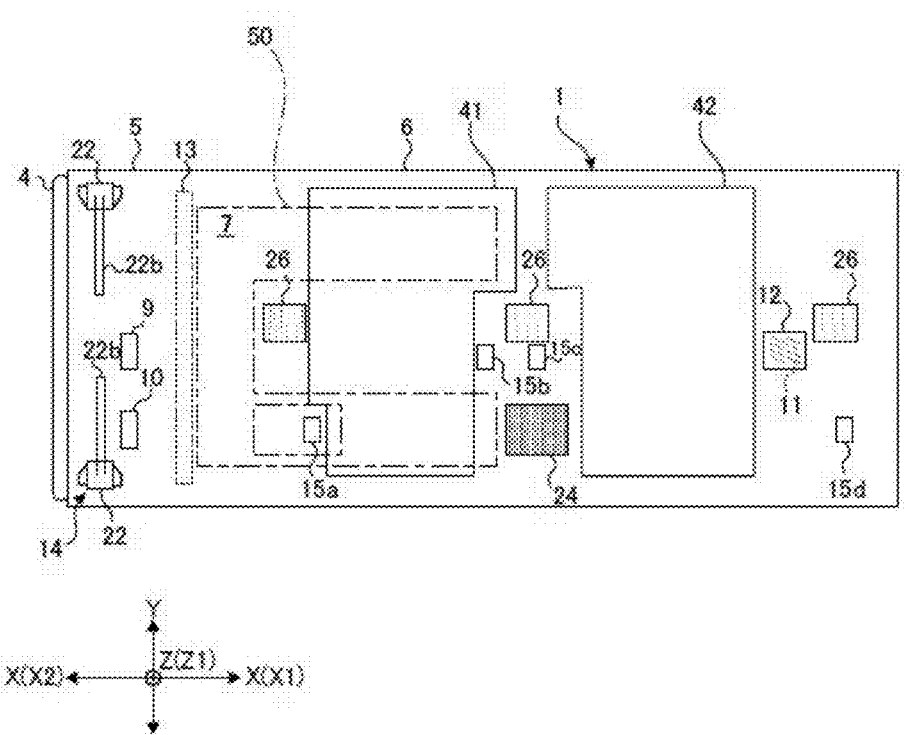
FIG. 8 is a diagram illustrating a state in which the insert from the state of FIG. 7 is further pushed to the rear side in the front and rear direction.

For example, the insert skimmer 50 is inserted from the insertion port 4 to move the shutter member 13 to the open position, and then, if the insert skimmer 50 is moved to the rear side, the card detection mechanism 15a is in the ON state as shown in FIG. 7. Then, if the insert skimmer 50 is moved further to the rear side, the card detection mechanism 15a returns to the OFF state by the card detection mechanism 15a overlapping with the through hole 50b of the insert skimmer 50 as shown in FIG. 8. In this state each of the card detection mechanisms 15a, 15b, 15c and 15d are in an OFF state, and card insertion detection mechanism 14 is in the OFF state, thus, the control unit 17 moves the shutter member 13 to the closed position and returns to a standby state.

Figure 9:
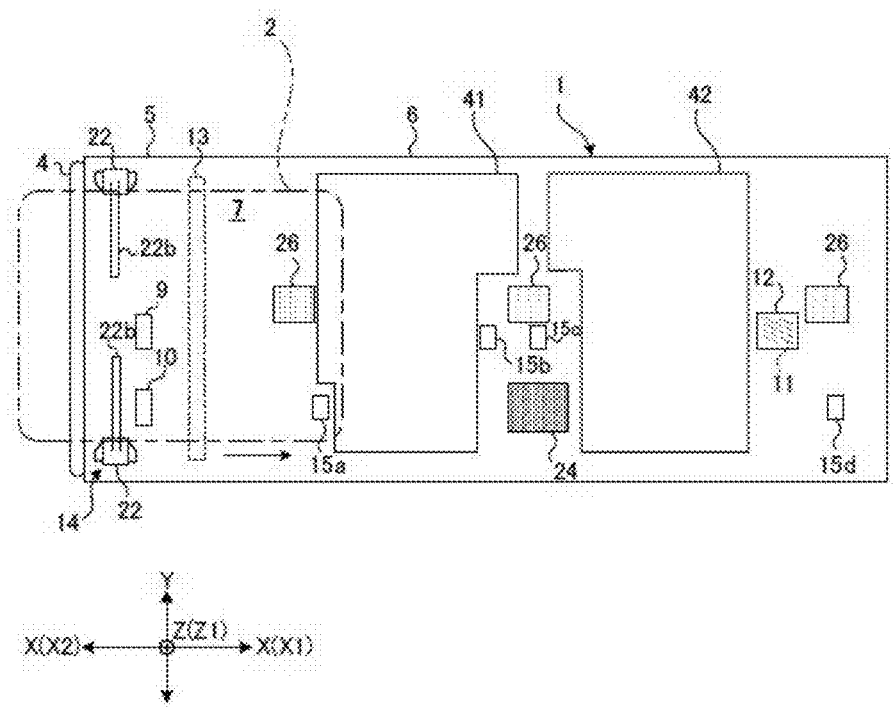
FIG. 9 is a diagram illustrating a state in which a card 2 is inserted in the insertion port 4 and the card detection mechanism 15a is in the ON state.
Figure 10:
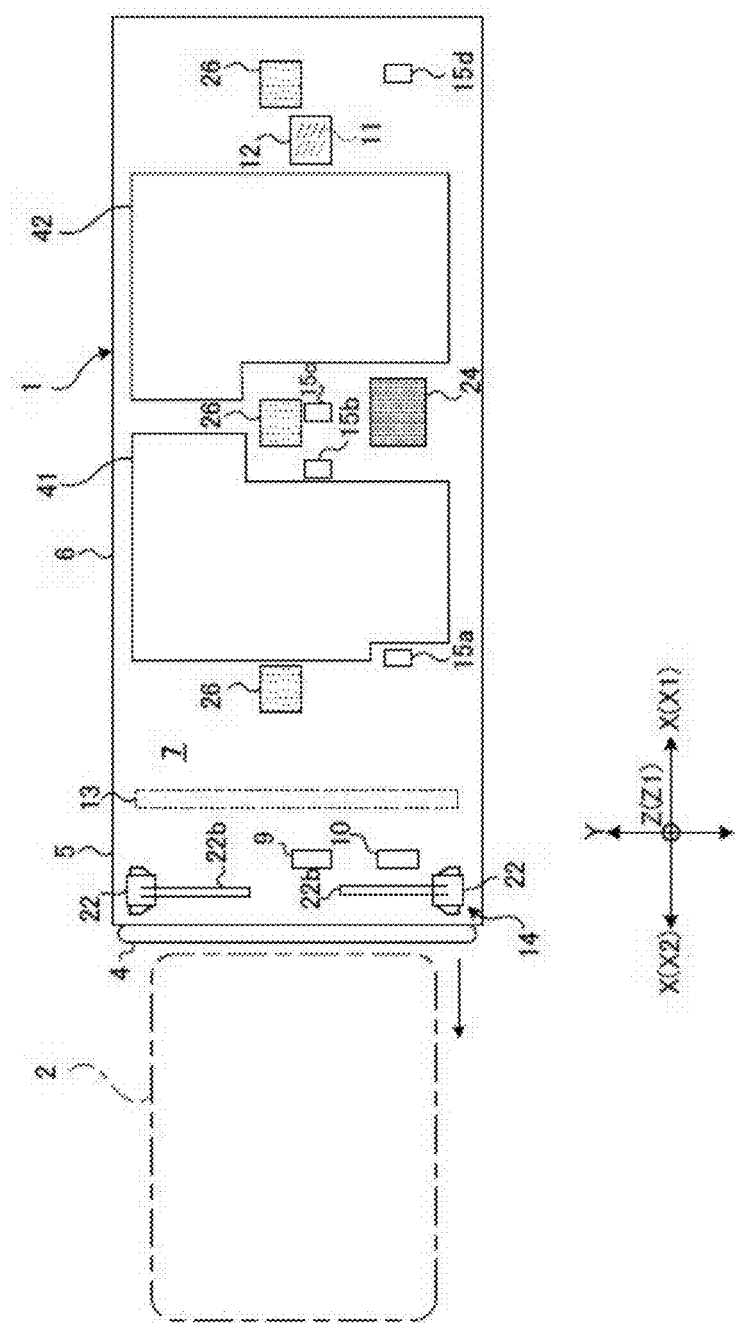
FIG. 10 is a diagram illustrating a state in which the card 2 from the state of FIG. 9 was pulled.

A similar behavior occurs when the card 2 is inserted from the insertion port 4, and then, pulled out. The card 2 is inserted from the insertion port 4 and the shutter member 13 moves to the open position, and then, if the card 2 is moved to the rear side, the card detection mechanism 15a is in the ON state as shown in FIG. 9. Then, if the card 2 is pulled out, the card detection mechanism 15a returns to the OFF state shown in FIG. 10. In this state, each of the card detection mechanisms 15a, 15b, 15c and 15d are in the OFF state, and card insertion detection mechanism 14 is in the OFF state, thus, the control unit 17 moves the shutter member 13 to the closed position and returns to a standby state.

When performing a control for moving the shutter member 13 to the closed position after moving the shutter member 13 to the open position, the control unit 17, as stated above, performs the foreign matter detection process to determine whether or not an object other than the card 2 such as an insert skimmer 50 is installed in the card conveyance path 7.

Figure 11:
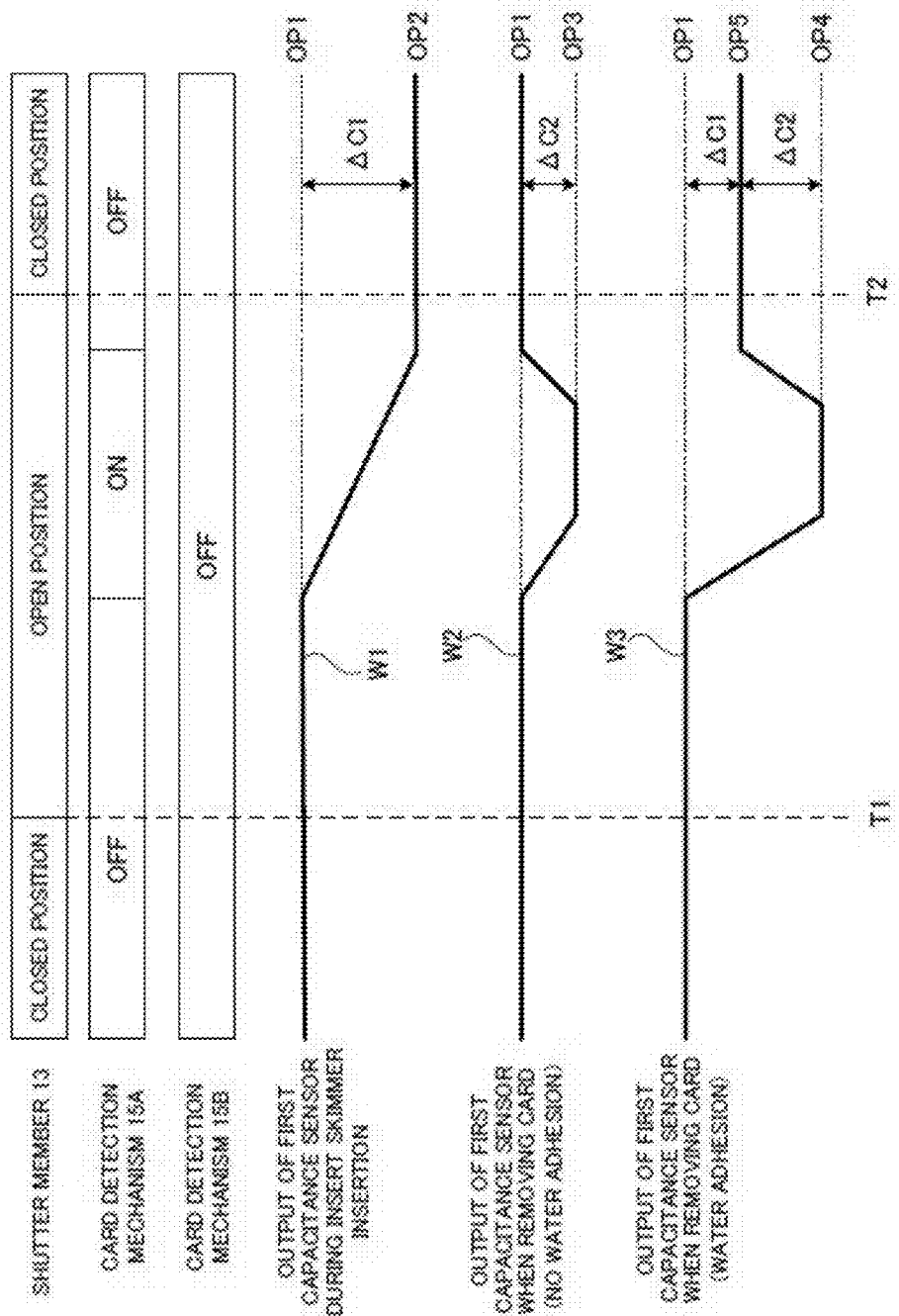
FIG. 11 is a diagram illustrating an example of the output waveform of a first capacitance sensor 41 during a period in which the aforementioned control for moving a shutter member 13 to the closed position after moving the shutter member 13 to the open position is performed.

FIG. 11 is a drawing illustrating an example of the output waveform of the first capacitance sensor 41 during the period in which the aforementioned control for moving the shutter member 13 to the closed position after moving the shutter member 13 to the open position is performed. The output waveform W1 shown in FIG. 11 illustrates the output waveform when the insert skimmer 50 shown in FIG. 5A and FIG. 5B is installed in the card conveyance path 7 (the state in FIG. 8). The output waveform W2 shown in FIG. 11 illustrates the output waveform when the card 2 is inserted and pulled out from the card conveyance path 7. The output waveform W3 shown in FIG. 11 illustrates the output waveform when a card 2 adhered with water is inserted in the card conveyance path 7 and pulled out, and the water remained on the card conveyance path 7.

As shown in the output waveform W1 of FIG. 11, when the insert skimmer 50 is installed in the card conveyance path 7 and the aforementioned control is terminated, the output of the first capacitance sensor 41 decreases from the output value OP1 to the output value OP2, and then, is maintained at the output value OP2.

Further, as shown in the output waveform W2 of FIG. 11, when the card 2 is removed and the aforementioned control is terminated, the output of the first capacitance sensor 41 decreases from the output value OP1 to the output value OP3, and then, returns to the output value OP1.

Further, as shown in the output waveform W3 of FIG. 11, the card to which water adhered is removed, and as a result, when water remains in the card conveyance path 7 and the aforementioned control is terminated, the output of the first capacitance sensor 41 decreases from the output value OP1 to the output value OP4, and then, increases to the output value OP5 and is maintained at the output value OP5.

(Details of Foreign Matter Detection Process)

The control unit 17 calculates a first output difference $\Delta C1$ which is the difference between the output of the first capacitance sensor 41 in the first state in which the shutter member 13 is in the closed position and the output of the first capacitance sensor 41 in the second state in which the shutter member 13 is moved from the first state to the open position and then moved to the closed position.

When the output of the first capacitance sensor 41 changed such as the output waveform W1, the control unit 17 calculates the difference of the output value OP1 which is the value prior to time T1 in this output waveform W1 and the output value OP2 which is the value after time T2 in this output waveform W1 as the first output difference $\Delta C1$. Further, when the output of the first capacitance sensor 41 changed such as the output waveform W2, the control unit 17 calculates the difference between the output value OP1 which is the value prior to time T1 in this output waveform W2 and the output value OP1 which is the value after time T2 in this output waveform W2 as the first output difference $\Delta C1$. Further, when the output of the first capacitance sensor 41 changed such as the output waveform W3, the control unit 17 calculates the difference between the output value OP1 which is the value prior to time T1 in this output waveform W3 and the output value OP5 which is the value after time T2 in the output waveform W3 as the first output difference $\Delta C1$.

Furthermore, the control unit 17 calculates the second output difference $\Delta C2$ which is the difference between the maximum output of the first capacitance sensor 41 in a period from the first state to the second state (between time T1 and time T2 in FIG. 11) and the output of the first capacitance sensor 41 in the second state.

Specifically, when the output of the first capacitance sensor 41 changed such as the output waveform W1, the control unit 17 calculates the difference between the output value OP2 which is a maximum value between time T1 and time T2 in this output waveform W1 and the output value OP2 which is the value after time T2 in this output waveform W1 as the second output difference $\Delta C2$. Further, when the output of the first capacitance sensor 41 changed such as the output waveform W2, the control unit 17 calculates the difference between the output value OP3 which is a maximum value between time T1 and time T2 in this output waveform W2 and the output value OP1 which is the value after time T2 in this output waveform W2 as the second output difference $\Delta C2$. Further, when the output of the first capacitance sensor 41 changed such as the output waveform W3, the control unit 17 calculates the difference between the output value OP4 which is a maximum value between time T1 and time T2 in this output waveform W3 and the output value OP5 which is the value after time T2 in this output waveform W3 as the second output difference $\Delta C2$.

When the insert skimmer 50 is installed in the card conveyance path 7, as is understood from the output waveform W1 of FIG. 11, while the first output difference $\Delta C1$ is a large value, the second output difference $\Delta C2$ is a small value. Further, the card 2 is pulled out, and as a result, when water does not remain in the card conveyance path 7, the first output difference $\Delta C1$ is a small value as is understood from the output waveform W2 of FIG. 11. Further, the card 2 is pulled out, and as a result, when water remains in the card conveyance path 7, both of the first output difference $\Delta C1$ and the second output difference $\Delta C2$ are large values as is understood from the output waveform W3 of FIG. 11. Therefore, depending on the size of the first output difference $\Delta C1$ and the second output difference $\Delta C2$, it can be determined whether or not the insert skimmer 50 has been installed in the card conveyance path 7.

Specifically, the control unit 17 determines that an object other than the card 2 (insert skimmer 50) has been installed in the card conveyance path 7 when the first output difference $\Delta C1$ is the predetermined first threshold or more, and, the second output difference $\Delta C2$ is less than the predetermined second threshold. The control unit 17 performs the removal of the insert in the case when the first output difference $\Delta C1$ is less than the first threshold and the case when the first output difference $\Delta C1$ is the first threshold or more and the second output difference $\Delta C2$ is the second threshold or more, in short, it is determined that the insert skimmer 50 has not been installed in the card conveyance path 7.

When the control unit 17 determined that the insert skimmer 50 is installed in the card conveyance path 7, the error information indicating that the insert skimmer 50 is inserted is recorded in the ROM.

Until the error information recorded in the ROM is deleted, the control unit 17 returns an error to the request from the host device 3, and the incorporation operation of the card 2 is not performed. When an error release request is received from the host device 3, the control unit 17 deletes the error information recorded in the ROM, and returns to the normal operation mode.

Effect of the Card Reader of the Embodiment

The card reader 1 can discriminate between the state in which the insert skimmer 50 is installed shown in FIG. 8 and the state in which the card 2 is pulled out after being inserted, and thus, can detect the insertion of the insert skimmer 50 with a high accuracy. The crime prevention effect can improve thereby.

Modification Example of the Card Reader of the Embodiment

Figure 12:
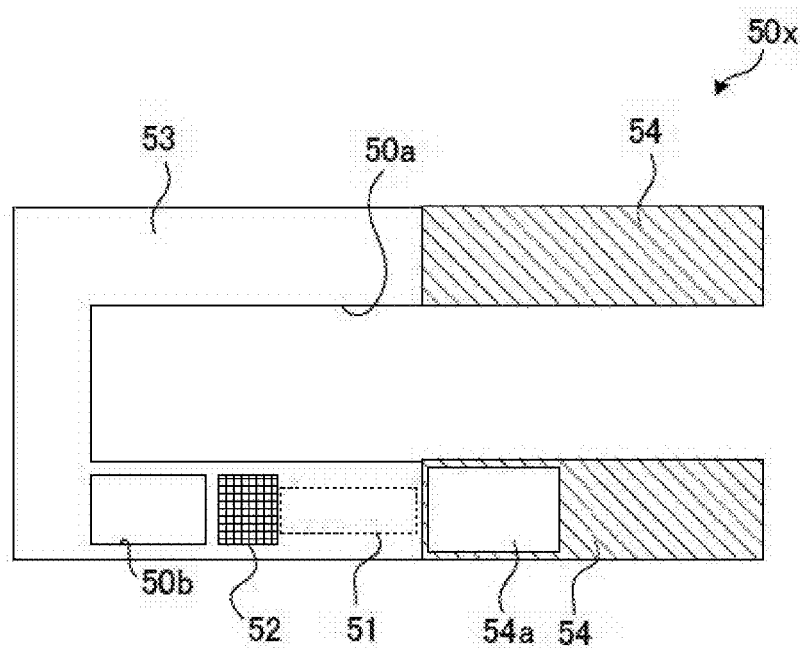
FIG. 12 is a diagram illustrating an example of an assumed insert skimmer 50x.
Figure 13:
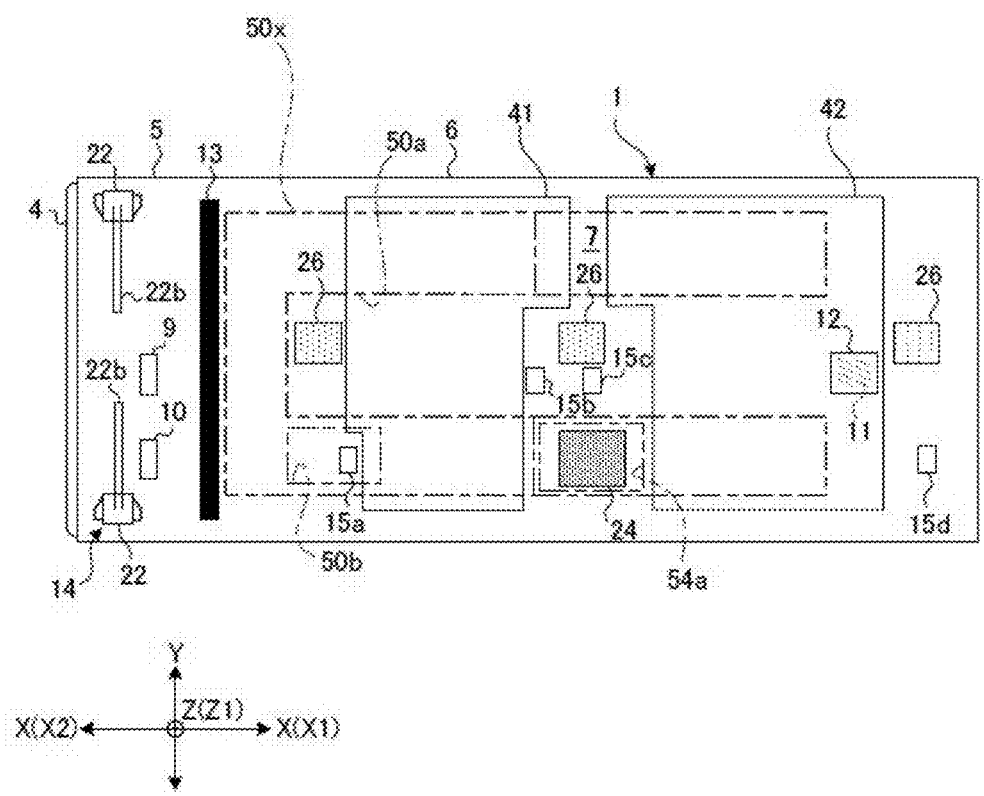
FIG. 13 is a plan view illustrating a state in which the insert skimmer 50x shown in FIG. 12 is inserted in the main body part 6 of the card reader 1.

FIG. 12 is a diagram illustrating an example of an assumed insert skimmer 50x. FIG. 13 is a plan view illustrating a state in which the insert skimmer 50x shown in FIG. 12 is inserted in the main body part 6 of the card reader 1. The insert skimmer 50x is constituted by a first main body part 53 and a second main body part 54. The first main body part 53 is constituted in the same manner as the insert skimmer 50 shown in FIG. 5A. The second main body part 54 is constituted by a different material than the first main body part 53. The second main body part 54 is connected to the end part of the rear side in the front and rear direction of the first main body part 53. An aperture 54a for avoiding the magnetic head 24 is formed in a part of the second main body part 54.

FIG. 14 is a diagram illustrating an example of the output waveform of the capacitance sensor during a period in which the aforementioned control for moving the shutter member 13 to the closed position after moving the shutter member 13 to the open position is performed. The output waveform W4 shown in FIG. 14 illustrates the output waveform of the second capacitance sensor 42 when the insert skimmer 50x shown in FIG. 12 is installed in the card conveyance path 7 (the state in FIG. 13). The output waveform W5 shown in FIG. 14 illustrates the output waveform of the second capacitance sensor 42 when the insert skimmer 50x shown in FIG. 12 is installed in the card conveyance path 7 (the state in FIG. 13).

The insert skimmer 50x shown in FIG. 12 is constituted by different materials for the first main body part 53 and the second main body part 54. Therefore, when the insert skimmer 50x is inserted in the card conveyance path 7, the change of the output of the first capacitance sensor 41 is the same as the output waveform W3 shown in FIG. 11. In short, when the insert skimmer 50x is installed in the card conveyance path 7, if only the output of the first capacitance sensor 41 is observed, it is difficult to discriminate the case when water remained when the card is removed.

Even in this case, when the insert skimmer 50x is inserted in the card conveyance path 7, the output of the second capacitance sensor 42 decreases from the first state to the second state, and the value will be maintained after the decrease. Therefore, the control unit 17 calculates the third output difference ΔC3 which is the difference between the output of the second capacitance sensor 42 in the first state in which the shutter member 13 is in the closed position and the output of the second capacitance sensor 42 in the second state in which the shutter member 13 is moved from this first state to the open position and then moved to the closed position. Moreover, the control unit 17 determines that an object other than the card 2 has been installed in the card conveyance path 7 when the third output difference ΔC3 is the first threshold or more.

Effect of Card Reader of the Modification Example

Even when the insert skimmer 50x in which the output waveform of the first capacitance sensor 41 can change in the same manner as the output waveform W3 is installed in the card conveyance path 7, the card reader 1 of the modification example can detect this due to the output of the second capacitance sensor 42. Therefore, the crime prevention performance can improve.

As described above, this specification discloses the following content.

(1)

A card reader comprising:

a main body part including a card conveyance path in which a card inserted into an insertion port is conveyed;

a shutter member structured to move between a closed position which closes the card conveyance path and an open position which opens the card conveyance path;

a first capacitance sensor provided in the main body part and structured to detect that an object is present in the card conveyance path; and a control unit structured to calculate a first output difference which is a difference between an output of the first capacitance sensor in a first state in which the shutter member is in the closed position and the output of the first capacitance sensor in a second state in which the shutter member moves from the first state to the open position and then moves to the closed position, calculate a second output difference which is a difference between a maximum output of the first capacitance sensor in a period from the first state to the second state and the output of the first capacitance sensor in the second state, and perform a process for determining that an object other than the card is installed in the card conveyance path when the first output difference is a predetermined first threshold or more, and the second output difference is less than a predetermined second threshold.

When the first output difference is the first threshold or more and the second output difference is less than the second threshold, it can be determined that the output of the capacitance sensor changes substantially in one direction while switching from the first state to the second state. Further, even if the first output difference is the first threshold or more, when the second output difference is the second threshold or more, it can be determined that the output of the capacitance sensor is greatly increasing or decreasing while switching from the first state to the second state. It is considered that the output of the capacitance sensor greatly increases or decreases because the first output difference finally reaches the first threshold or more, for example, when a liquid is attached to the card, and this liquid remains in the card conveyance path after the ejection of this card. On the one hand, when the insert skimmer is installed in the card conveyance path, it is difficult to consider that the output of the capacitance sensor greatly increases or decreases while switching from the first state to the second state. Therefore, the case when a liquid remains in the card conveyance path can be discriminated from the case when an object such as the insert skimmer is attached by determining that an object other than the card is installed when the first output difference is the first threshold or more and the second output difference is less than the second threshold, and the detection of the foreign matter can be performed with a high accuracy.

(2) The card reader according to (1), wherein the main body part includes, on the rear side in an insertion direction of the card relative to the first capacitance sensor, a second capacitance sensor structured to detect that an object is present in the card conveyance path, and the control unit further calculates a third output difference which is a difference between an output of the second capacitance sensor in the first state and the output of the second capacitance sensor in the second state, and determines that an object other than the card is installed in the card conveyance path when the third output difference is the first threshold or more.

According to (2), even when the insert skimmer (for example, a plurality of materials having a large length in the insertion direction, and having different capacitances to be detected are configured to be parallel in the insertion direction, and the like) in which the first output difference is the first threshold or more and the second output difference is less than the second threshold is inserted in the card conveyance path, the installation of this the insert skimmer can be detected due to the size of the third output difference, and the crime prevention performance can improve.

(3) The card reader according to (1), wherein the main body part comprises a first card detection mechanism and a second card detection mechanism structured to detect a position of the card to be conveyed in the card conveyance path, the first card detection mechanism is disposed on the insertion port side relative to the second card detection mechanism, and when an insert is detected by the first card detection mechanism after moving the shutter member from the closed position to the open position, and then the detection of the insert is not performed by the second card detection mechanism at a timing when the detection of the insert is not performed by the first card detection mechanism, the control unit performs control for moving the shutter member to the closed position to bring the shutter member into the second state, and performs the process when the control is performed.

According to (3), the process of (1) is performed only when aforementioned control which is different than that during normal card conveyance is performed, thus, it is possible to prevent the false detection of a foreign matter during normal card transactions.

(4) A foreign matter detection method for a card reader comprising a main body part including a card conveyance path in which a card inserted into an insertion port is conveyed, a shutter member structured to move between a closed position which closes the card conveyance path and an open position which opens the card conveyance path, and a first capacitance sensor provided in the main body part and structured to detect that an object is present in the card conveyance path, the foreign matter detection method comprising calculating a first output difference which is a difference between an output of the first capacitance sensor in a first state in which the shutter member is in the closed position and the output of the first capacitance sensor in a second state in which the shutter member moves from the first state to the open position and then moves to the closed position, calculating a second output difference which is a difference between a maximum output of the first capacitance sensor in a period from the first state to the second state and the output of the first capacitance sensor in the second state, and determining that an object other than the card is installed in the card conveyance path when the first output difference is a predetermined first threshold or more, and the second output difference is less than a predetermined second threshold.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader comprising:
    a main body part comprising a card conveyance path in which the card inserted into an insertion port is conveyed;
    a shutter member structured to move between a closed position which closes the card conveyance path and an open position which opens the card conveyance path;
    a first capacitance sensor provided in the main body part and structured to detect that an object is present in the card conveyance path; and
    a control unit structured to:
        calculate a first output difference which is a difference between an output of the first capacitance sensor in a first state in which the shutter member is in the closed position and the output of the first capacitance sensor in a second state in which the shutter member moves from the first state to the open position and then moves to the closed position,
        calculate a second output difference which is a difference between a maximum output of the first capacitance sensor in a period from the first state to the second state and the output of the first capacitance sensor in the second state, and
        determine that an object other than the card is installed in the card conveyance path when the first output difference is a predetermined first threshold or more, and the second output difference is less than a predetermined second threshold.

2. The card reader according to claim 1, wherein
    the main body part comprises, on the rear side in an insertion direction of the card relative to the first capacitance sensor, a second capacitance sensor structured to detect that an object is present in the card conveyance path, and
    the control unit is further structured to calculate a third output difference which is a difference between an output of the second capacitance sensor in the first state and the output of the second capacitance sensor in the second state, and determine that an object other than the card is installed in the card conveyance path when the third output difference is the first threshold or more.

3. The card reader according to claim 2, wherein
the main body part comprises a first card detection mechanism and a second card detection mechanism structured to detect a position of the card to be conveyed in the card conveyance path,
the first card detection mechanism is disposed on the insertion port side relative to the second card detection mechanism, and
the control unit is structured such that, when an insert is detected by the first card detection mechanism after moving the shutter member from the closed position to the open position, and then the detection of the insert is not performed by the second card detection mechanism at a timing when the detection of the insert is not performed by the first card detection mechanism, the control unit performs control for moving the shutter member to the closed position to bring the shutter member into the second state, and performs the process when the control is performed.

4. The card reader according to claim 1, wherein
the main body part comprises a first card detection mechanism and a second card detection mechanism structured to detect a position of the card to be conveyed in the card conveyance path,
the first card detection mechanism is disposed on the insertion port side relative to the second card detection mechanism, and
the control unit is structured such that, when an insert is detected by the first card detection mechanism after moving the shutter member from the closed position to the open position, and then the detection of the insert is not performed by the second card detection mechanism at a timing when the detection of the insert is not performed by the first card detection mechanism, the control unit performs control for moving the shutter member to the closed position to bring the shutter member into the second state, and performs the process when the control is performed.

5. A foreign matter detection method for a card reader comprising a main body part including a card conveyance path in which a card inserted into an insertion port is conveyed, a shutter member structured to move between a closed position which closes the card conveyance path and an open position which opens the card conveyance path, and a first capacitance sensor provided in the main body part and structured to detect that an object is present in the card conveyance path,
the foreign matter detection method comprising:
calculating a first output difference which is a difference between an output of the first capacitance sensor in a first state in which the shutter member is in the closed position and the output of the first capacitance sensor in a second state in which the shutter member moves from the first state to the open position and then moves to the closed position, calculating a second output difference which is a difference between a maximum output of the first capacitance sensor in a period from the first state to the second state and the output of the first capacitance sensor in the second state, and determining that an object other than the card is installed in the card conveyance path when the first output difference is a predetermined first threshold or more, and the second output difference is less than a predetermined second threshold.

* * * * *